United States Patent [19]
Weihing et al.

[11] Patent Number: 5,607,220
[45] Date of Patent: Mar. 4, 1997

[54] HEADLIGHT FOR A VEHICLE

[75] Inventors: Gerhard Weihing, Gomaringen; Georg Ebinger, Kusterdingen; Ulrike Hartick, Boblingen; Horst Runtschke, Nagold; Eberhard Baur, Rottenburg, all of Germany

[73] Assignees: Robert Bosch GmbH; Mercedes-Benz AG, Stuttgart, Germany

[21] Appl. No.: 317,387

[22] Filed: Oct. 4, 1994

[30] Foreign Application Priority Data

Oct. 4, 1993 [DE] Germany ............... 43 33 769.4

[51] Int. Cl.⁶ ............................................. B60Q 1/06
[52] U.S. Cl. ..................... 362/66; 362/284; 362/289; 362/324
[58] Field of Search .................. 362/66, 269, 273, 362/277, 284, 285, 289, 324, 428

[56] References Cited

U.S. PATENT DOCUMENTS 5,068,769 11/1991 Umeda et al. .................. 362/61
5,365,414 11/1994 Chikada et al. .................. 362/66 X

*Primary Examiner*—Stephen F. Husar
*Attorney, Agent, or Firm*—Michael J. Striker

[57] ABSTRACT

A headlight has a housing and a reflector arranged in the housing adjustably by an adjusting screw. An indicating device controls the setting of the reflector and has a movable indicating part which follows turning of the adjusting screw and a substantially stationary indicating part arranged outside of the housing. The substantially stationary indicating part is arranged on a guide so that it is difficult to displace. In other words, the substantially stationary indicating part can be displaced to assume a base setting and in its set position is fixed. However, during travels of the vehicle, it no longer displaces on the guide under the action of vibrations and other influences. The ability of the substantially stationary indicating part to be difficult to displace can be provided for example by arranging of the substantially stationary indicating part on the guide with a slight press fit.

14 Claims, 4 Drawing Sheets

HEADLIGHT FOR A VEHICLE

BACKGROUND OF THE INVENTION

The present invention relates to a headlight for a vehicle.

More particularly, it relates to a headlight for a vehicle which has a reflector supported on a holder and adjustable relative to the latter by an adjusting device, and an indicating device which indicates a deviation of a setting of the reflector from a predetermined nominal setting.

Headlights of the above mentioned general type are known in the art. One of such headlights is disclosed for example in the U.S. Pat. No. 5,068,769. The holder which supports the reflector adjustably by the adjusting device is formed in this patent as a housing, the reflector is arranged inside the housing, and the adjusting device has an adjusting screw which extends outwardly beyond the housing and turns so as to change the setting of the reflector relative to the housing. Moreover, the indicating device which indicates the deviation of the setting of the reflector from a predetermined nominal setting includes a movable indicating part which is screwed on the adjusting screw and is guided axially displaceably and non-rotatably in a housing part of the headlight, while a substantially stationary indicating part is provided on a housing part of the reflector. In view of the thread connection of the movable indicating part with the adjusting screw, it follows the adjusting movement of the reflector during turning of the adjusting screw. The movable indicating part has a pointer which cooperates with a scale arranged on the substantially stationary indicating part. The substantially stationary indicating part is fixed by a clamping screw on the housing part of the headlight. After releasing the clamping screw, the substantially stationary indicating part is however movable to a base setting in direction of movement of the movable indicating part and after tightening of the clamping screw is fixed again in this position. Because of the clamping screw which must be first released and then again tightened, the base setting substantially stationary indicating part is performed in a complicated manner. Since the movable indicating part is arranged outside of the headlight housing, it can be easily damaged, for example deformed, and therefore the accuracy of the indicating device can be worsened.

SUMMARY OF THE INVENTION

Accordingly, it is an object of the present invention to provide a headlight of the above mentioned general type, which avoids the disadvantages of the prior art.

In keeping with these objects and with others which will become apparent hereinafter, one feature of the present invention resides, briefly stated, in a headlight in which the substantially stationary indicating part is arranged in a guide so that it is displaceable in the guide but at the same time is difficult to displace.

When the headlight is designed in accordance with the present invention, the substantially stationary indicating part assumes its base setting simply by a displacement in the guide; however, at the same time due to the fact that the indicating part is difficult to displace, its unintentional adjustment as a result of vibrations and other influences is prevented.

In accordance with another feature of the present invention, the substantially stationary indicating part has a projection provided with a recess and engaging the rail-like guide, wherein the recess in condition when the substantially stationary indicating part is not arranged on the guide has a smaller cross-section than the guide and is elastically expansible.

In accordance with another embodiment, the substantially stationary indicating part has a projection provided with a recess and engaging the rail-like guide, and the guide in condition when the indicating is not arranged on it, has a greater cross-section than the recess and its cross-section is elastically reducible.

When the headlight is designed in accordance with these features, the substantially stationary indicating part is made difficult to displace without the use of additional components.

In accordance with still a further feature of the present invention, the holder is formed as a housing in which the reflector and the movable indicating part are arranged, the housing is provided with a transparent portion through which the movable indicating part can be seen from outside of the housing, and the substantially stationary indicating part is arranged outwardly of the housing in the region of the transparent portion.

When the headlight is designed in accordance with the present invention, the movable indicating part is arranged so that it is protected from damages and at the same time the indicating device can be easily observed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Figure 1:
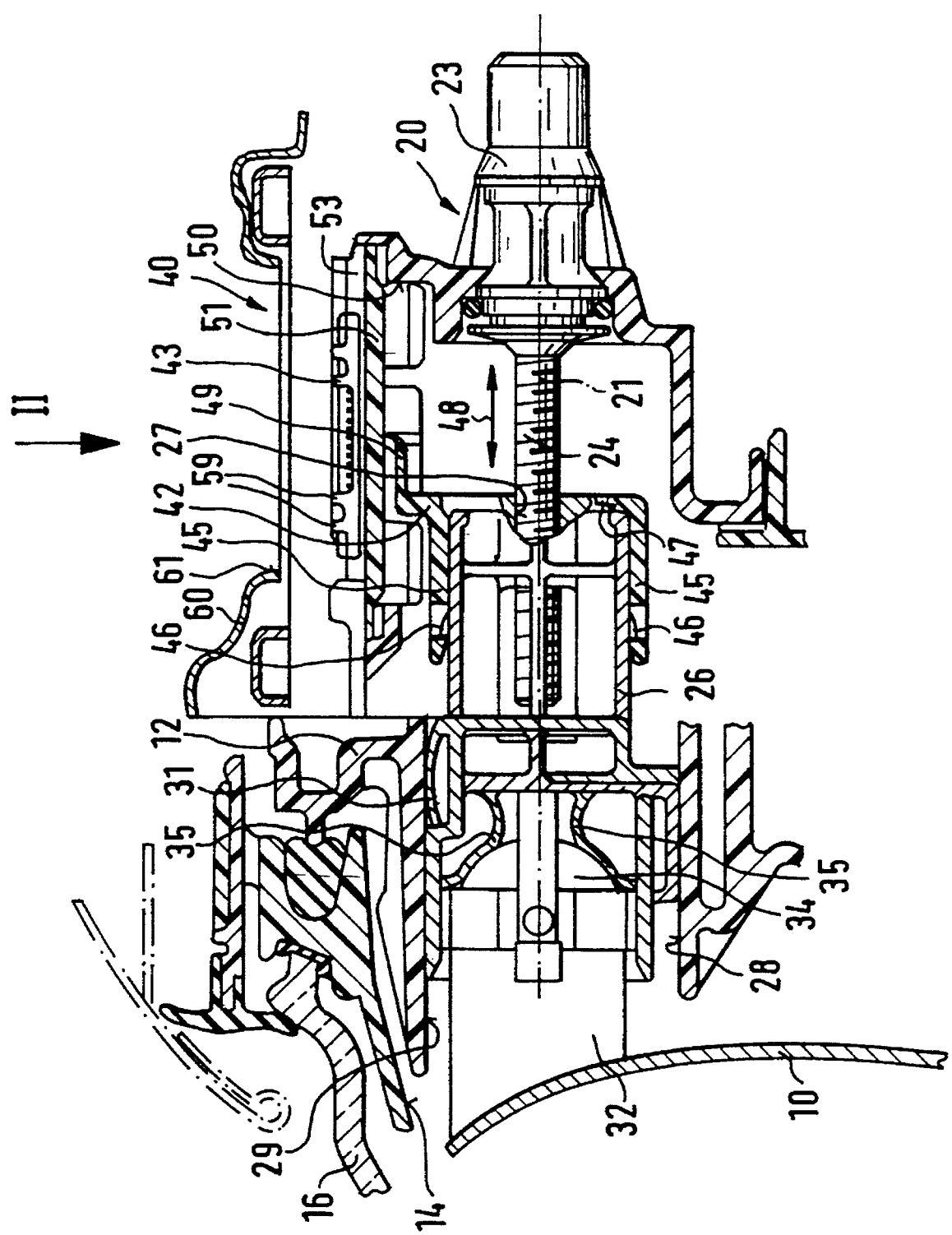
FIG. 1 is a view showing a vertical longitudinal section of the headlight for a vehicle in accordance with a first embodiment.

DESCRIPTION OF THE PREFERRED EMBODIMENTS headlights for vehicles, in particular motor vehicles is shown in FIGS. 1–6. It has a reflector 10 provided with a not shown light source. The reflector 10 is arranged on a holder 12 which is mounted on a chassis of the vehicle. In the shown embodiments, the holder 12 is formed as a housing which accommodates the reflector 10. The housing 12 of the headlight has an opening 14 at its front, light outlet end and a transparent cover plate 16 covers the opening and is mounted on the housing 12. The cover plate 16 can be smooth or can be provided with optically effective elements which influence the light reflected by the reflector 10. The headlight housing 12 can be composed of synthetic plastic material or another suitable material. In accordance with an alternative embodiment of the headlight, it is also possible to form the holder 12 as a supporting frame with a front edge on which the cover plate 16 of the reflector 10 is mounted.

The reflector 10 is connected with the housing 12 by several bearing points. In the shown embodiments three bearing points are provided and are arranged so that two bearing points determine a turning axis for the reflector 10. One bearing point is formed as a so-called fixed bearing and two remaining bearing points are formed as so-called adjustable bearings. One adjusting bearing and one fixed bearing determine a horizontal turning axis for the reflector 10 while another adjustable bearing determines together with the fixed bearing a vertical turning axis for the reflector 10. By turning the reflector 10 about its horizontal turning axis, the inclination of the light beam reflected by the reflector 10 is changed, and by turning the reflector 10 about its vertical turning axis the lateral direction of the light bundle reflected by the reflector changes as well.

Figure 3:
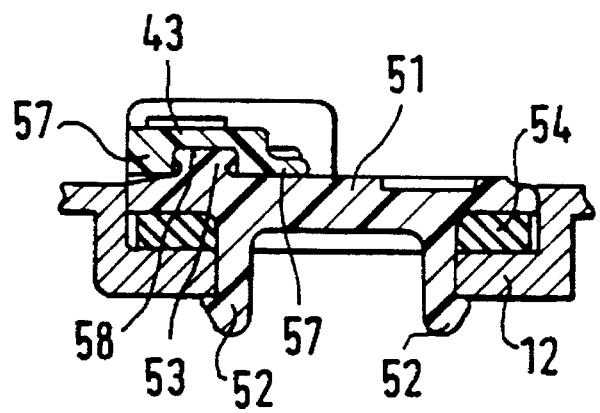
FIG. 3 is a view showing a transverse section of the headlight taken along the line III—III in FIG. 2.

At least one adjusting device is associated with at least one adjustable bearing of the reflector 10 and has an adjusting screw 20. The adjusting screw 20 is held on the headlight housing 12 rotatably, but not displaceably along its longitudinal axis 21. The adjusting screw 20 is provided with a head 23 which extends outwardly beyond the housing 12 to allow its actuation. Further, the adjusting screw 20 is provided with a threaded shaft 24 arranged inside the housing 12, and a connecting part 26 is screwed on the threaded shaft 24. The connecting part 26 has a threaded opening 27 for screwing on the threaded shaft 24. It is guided displaceably in the housing 12 along the longitudinal axis 21 of the adjusting screw 20. The housing 12 has for this purpose two walls 28 and 29 which extend parallel to the longitudinal axis 21 of the adjusting screw 20. An elastically deformable bracket 31 extends from the connecting part 26 to the walls 28, 29. FIG. 1 shows only the bracket 21 which faces the upper wall 29, while FIG. 3 shows both brackets 31. During insertion of the connecting part 26 between the walls 28 and 29, the bracket 31 is elastically compressed so that the connecting part 26 is arranged under pretensioning between the walls 28 and 29.

A carrier 32 extends rearwardly from the rear side of the reflector 10 and is articulately connected with the connecting part 26. The free end 34 of the carrier 32 has the shape of a circular arc and is arranged in a receptacle in the connecting part 26. A depression is provided in an end surface of the carrier end arranged in the receptacle and formed substantially concentrically to its circular arc portion 34. A projection extending from the connecting part 26 engages in the depression and therefore provides an arrestable connection of the reflector 10 with the connecting part 26. Bracket-shaped spring elements 35 are arranged in the receptacle on the connecting part 26. The carrier 32 after providing the connection with the connecting part 26 comes to abutment with its circular arc portion 34 against the spring elements 35. The spring elements 35 elastically deform and therefore a pretensioning is provided, so that the connection of the carrier 32 with the connecting part 26 is gap free. The carrier 32 together with the reflector 10 is turnably received in the connecting part 26. A turning movement is performed about the projection of the connecting part 26 engaging in the depression in the carrier, and the circular portion 34 of the carrier 32 slides along the spring elements 35.

During turning of the adjusting screw 20, the connecting part 26 moves along the longitudinal axis 21 of the adjusting screw 20. Thereby the distance between the reflector 10 and the headlight housing 12 and thereby its setting changes.

Figure 2:
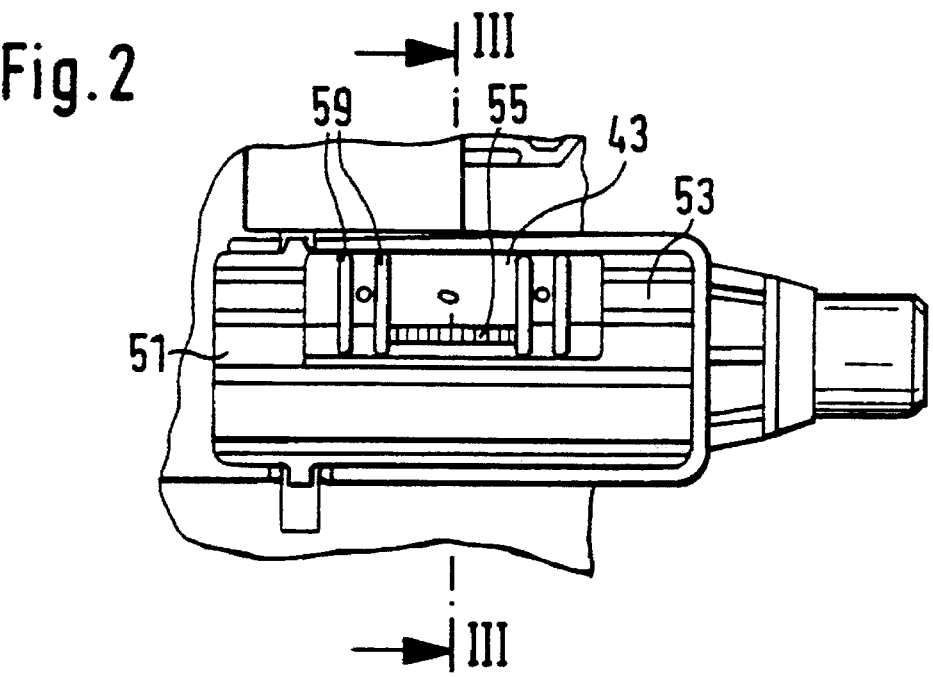
FIG. 2 is a view showing a section of the headlight with an indicating device as seen in direction of the arrow II in FIG. 1.

An indicating device 40 is provided on the headlight. It indicates the deviation of the setting of the reflector 10 from a predetermined nominal setting. FIGS. 1–3 show a first embodiment of the indicating device. The indicating device 40 has substantially two parts. In particular it has a movable indicating part 42 which follows the adjusting movement of the reflector 10 during turning of the adjusting screw 20, and a substantially stationary indicating part 43 arranged on the headlight housing 12. The movable indicating part 42 is arranged on the connecting part 26 and connected with it at least in direction of the longitudinal axis 21 of the adjusting screw 20, so that it follows its movement along the longitudinal axis 21. In the first embodiment the movable indicating part 42 is mounted on the connecting part 26 by an arresting connection. For this purpose the movable indicating part 42 has two elastically deformable arresting arms 45 which overlap the connecting part 26 and engage with its arresting hooks behind corresponding shoulders 46 of the connecting part 26. In its end position the movable indicating part 42 comes to abutment with its flange 47 against the connecting part 26 and is thereby rigidly connected by the arresting arms 45 in direction of the longitudinal axis 21 of the adjusting screw 20 with the connecting part 26. During turning of the adjusting screw 20 the movable indicating part 42 performs a movement parallel to the longitudinal axis 21 of the adjusting screw 20 in direction of the double arrow 48 in FIG. 1. The movable indicating part 42 has a pointer facing away from the connecting part 26 and having a free end which is arranged perpendicular to the adjusting screw 20 and offset to its longitudinal axis 21.

The headlight housing 12 is provided with an opening 50 in region of the pointer 49 of the movable indicating part 42. A transparent part 51 which forms a window closes the opening 50. The pointer 49 is visible from outside of the headlight housing 12 through the window 51. The window 51 is preferably inserted in an upwardly facing wall of the headlight housing 12 and is mounted by several arresting hooks 52 on the housing 12 as shown in FIG. 3. A sealing ring 54 is clamped between the window 51 and the housing 12. The window 51 is composed of a synthetic plastic material formed as an injection molded part. It is substantially flat and extends substantially parallel to the movement direction 48 of the movable indicating part 42. A guiding rail 53 is arranged on the outer side of the window 51 and extends parallel to the movement direction 48 of the movable indicating part 42. The guiding rail 53 has a dove-tail-shaped cross-section, and its cross-section can be symmetrical or asymmetrical. The indicating part 43 which is substantially stationary relative to the headlight housing 12 is arranged on the guiding rail 53. The indicating part 43 at its side facing away from the window 51 has a scale provided with several scale lines, and the central scale line is especially pronounced. The scale 52 of the substantially stationary indicating part 43 is arranged so that during the observation of the movable indicating part 42 through the window 51 it is arranged directly near its pointer 49. The substantially stationary indicating part 43 is composed of a synthetic plastic material and formed as an injection molded part.

The substantially stationary indicating part 43 has a projection 57 with a recess 58 at its side facing the window 51. It has a cross-sectional shape which corresponds to the cross-sectional shape of the guiding rail 53. The width of the recess 58 in condition not press fitted on the guiding rail 53 is substantially smaller than the width of the guiding rail 53. However, the recess 58 is expansible by elastic bending out of both projection parts 57 which limit it laterally. When the substantially stationary indicating part 43 is arranged on the guiding rail 53, and the indicating part 57 which engages on the guiding rail 53 with pretensioning provides a holding force due to the friction between the guiding rail 53 and the indicating part 43. As a result, the substantially stationary indicator part 43 is not freely displaceable on the guiding rail 53. The indicating part 43 is therefore arranged with a light fit on the guiding rail 53. When the holding force is overcome by a force acting in direction of the longitudinal extension of the guiding rail 53 on the indicating part 43, the substantially stationary indicating part 43 is displaceable on the guiding rail 53. The holding force of the indicating part 43 is dimensioned so that its displacement under the action of for example vibrations occurring during the travel of the vehicle is reliably prevented. With an asymmetrical cross-section of the guiding rail 53, the indicating part 43 can be displaced on it only in one position, so that it is guaranteed that its scale 55 faces toward the pointer 49.

Figure 3A:
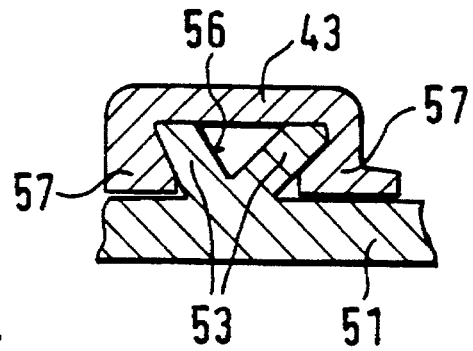
FIG. 3a is a view showing another variant of the indicating device.

FIG. 3a shows a variant of the indicating device 40 in which the substantially stationary indicating part 43 is rigid, however, the guiding rail 53 is elastically compressible transverse to its longitudinal extension. For this purpose the guiding rail 53 has for example a longitudinal slot 56 so that the rail parts arranged at both sides of the longitudinal slot 56 can be pressed toward one another. The width of the recess 58 in the indicating part 43 is substantially smaller than that of the guiding rail 53. Therefore during fitting of the indicating part 43 on the guiding rail 53, its rail parts are elastically compressed and engage the indicating part 43 with a pretensioning. With this construction of the guiding rail 53 a holding force for the indicating part 43 is applied due to the friction between the guiding rail 53 and the indicating part 43 and acts so that the indicating part 43 is not freely displaceable.

The substantially stationary indicating part 43 provided with two ribs 59 arranged at its side facing the window 51 at both ends. The ribs 59 are located at a small distance from one another and extend outwardly and transversely to the guiding rail 53. A tool for example a screwdriver can be placed between the ribs 59 for displacing the indicating part 43. In the first embodiment shown in FIGS. 1–3 a transverse carrier 60 of the chassis of the vehicle extends over the headlight in its mounted condition in the vehicle. The transverse carrier 60 has an opening 61 in the region of the indicating device 40. Through the opening the indicating device is visible and also through the opening the tool for displacing the substantially stationary indicating part 43 can be extended.

During mounting of the headlight an optical base setting is performed. In other words it is checked whether the light beam emitted by the headlight has a predetermined direction. When this is not the case, then during turning of the adjusting screw the setting of the reflector 10 is changed until the light bundle assumes the prescribed direction. In this setting of the reflector 10 and the pointer 49 of the movable indicating part 42, the substantially stationary indicating part 43 is displaced by the tool to the setting in which the central scale line of the scale 55 faces the pointer 49 of the movable indicating part 42. Starting from this setting the pointer 49 of the movable indicating part 42 shows the deviation of the setting of the reflector 10 from the prescribed nominal setting which is marked by the central scale line of the scale 55.

Figure 4:
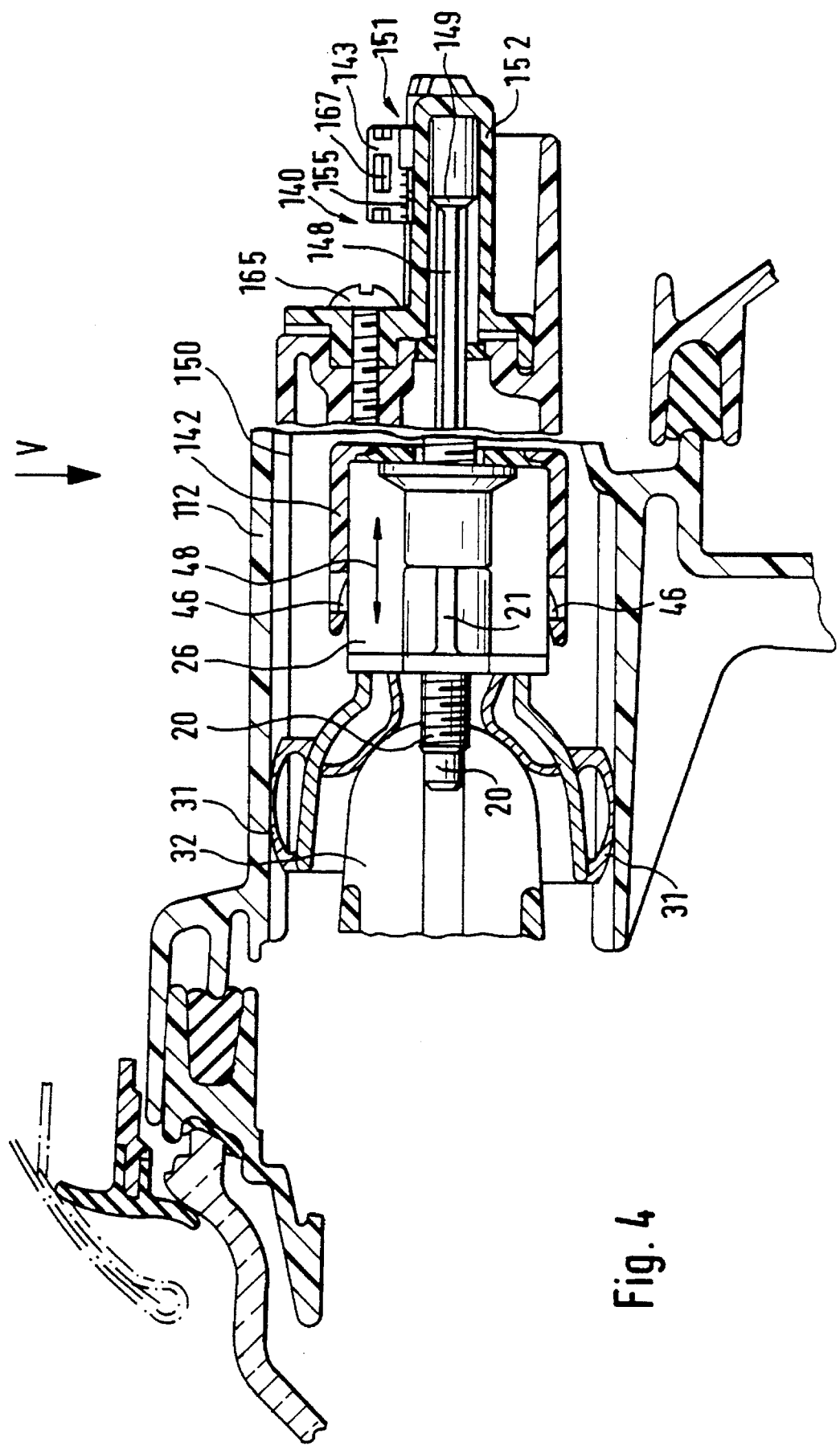
FIG. 4 is a view showing a vertical longitudinal section of the headlight in accordance with a second embodiment of the invention.
Figure 5:
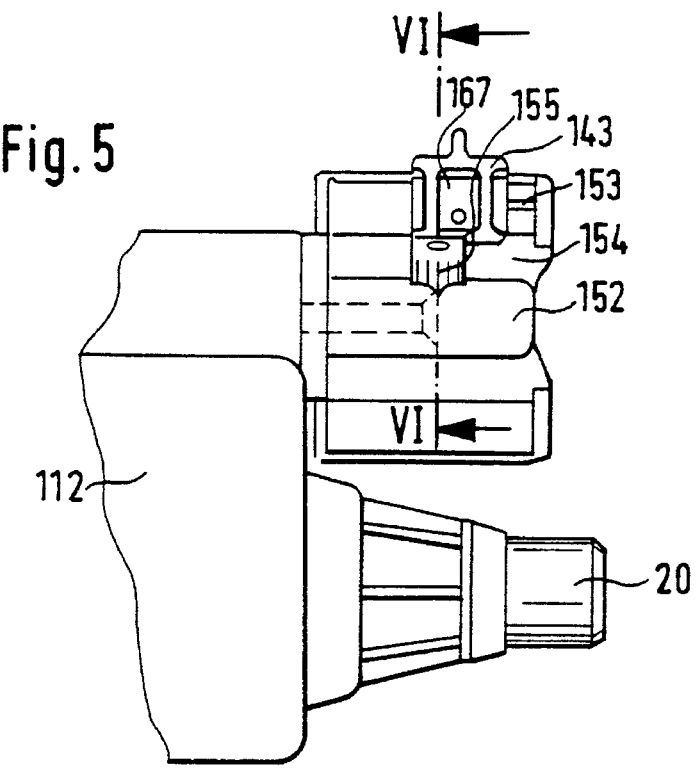
FIG. 5 is a view showing a part of the headlight with an indicating device as seen in direction of the arrow V—V in FIG. 4.
Figure 6:
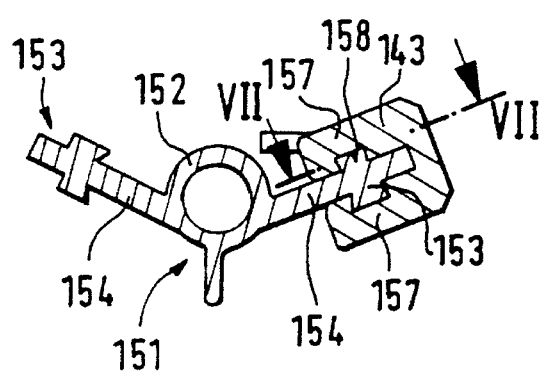
FIG. 6 is a view showing a transverse section of the headlight taken along the line VI—VI in FIG. 5.

FIGS. 4–6 illustrate a second embodiment of the headlight in accordance with the present invention, which differs from the first embodiment only by the indicating device 140. The indicating device 140 has the movable indicating part 142 and the substantially stationary indicating part 143. The movable indicating part 142 is mounted on the connecting part 26 by an arresting connection, similarly to the indicating part 42. An arm 148 projects parallel to the movement direction 48 of the movable indicating part 142 from it toward the rear side of the headlight. A free end 149 of the arm 148 is formed as a pointer. The arm 148 extends parallel to the longitudinal axis 21 of the adjusting screw 20, however, it is laterally offset relative to the adjusting screw 20. Depending on the predetermined mounting conditions, the arm 148 can be also offset relative to the adjusting screw 20 upwardly or downwardly. The arm 148 extends through an opening 150 in the rear wall of the headlight housing 112.

An indicating tube 151 composed of transparent material, for example synthetic plastic material, is mounted on the headlight housing 112 coaxially to the opening 150. The mounting of the indicating tube 151 on the headlight housing 112 is performed for example by one or several screws 165. The arm 148 of the indicating part 142 is arranged displaceably in the tubular part 152 of the indicating part 151 and the pointer 149 is visible from outside of the indicating tube 151. A carrier 154 is arranged on the indicating tube 151 laterally near the tubular part 152 in which the arm 148 is arranged. The carrier 154 is inclined upwardly relative to a horizontal plane from the tubular part 152. A guiding rail 153 is arranged correspondingly in the end region of the carrier 154 on its upper side and its lower side for the substantially stationary indicating part 143, which preferably is of one piece with the carrier 154. It is also possible to arrange one guiding rail 153 only on the upper side or on the lower side of the carrier 154. The guiding rails 153 extend parallel to the movement direction 148 of the movable indicating part 142 and have a dove-tail-shaped cross-section. The indicating part 143 has a projection 157 with a recess 158 having a cross-sectional shape corresponding to the shape of the end region of the carrier 154 with the guiding rails 153. The width of the recess 155 is substantially smaller than the width of the end region of the carrier 154 with the guiding rails 153. However, the recess 158 is expansible by elastic bending out of both indicating part 157 which laterally limit it.

When the substantially stationary indicating part 143 is arranged on the guiding rails 153, then a holding force is applied on it with pretensioning of the indicating part 157 engaging the guiding rails 153 because of the friction between the guiding rails 153 and the indicating part 143. The holding force acts so that the substantially stationary indicating part 143 is not freely displaceable on the guiding rails 153. When the holding force is overcome by a force acting in direction of the longitudinal extension of the guiding rails 153 on the indicating part 143, then the substantially stationary indicating part 143 is displaceable on the guiding rail 153. The indicating part 143 is arranged on the guiding rails 153 with a slight press fit (or in other words moderately tight press fit), so that an unintentional displacement of the indicating part 153 due to vibrations or similar actions is prevented. With the asymmetrical cross-section of the guiding rails 153, the indicating part 143 can be displaced only in one position, and therefore it is guaranteed that its scale 55 faces the pointer 149. The indicating part 143 is provided with one or several depressions 167 at its upwardly facing side, so that a tool for example a screwdriver can be inserted in the depressions.

It is also possible with the indicating tube 151 shown in FIGS. 5 and 6 to provide at both sides near the tubular part 152 correspondingly a carrier part 154 with one or two guiding rails 153. This has the advantage that depending on the mounting conditions of the headlight in the vehicle chassis, the substantially stationary indicating part 143 can be fitted either on the left or on the right guiding rails 153.

It is to be understood that in the second embodiment it is also possible to provide such a construction that the guiding rails 153, similarly to the variant shown in FIG. 3a and described above, is elastically compressible transversely to its longitudinal extension and thereby the holding force is applied for the substantially stationary indicating part 143.

Figure 6A:
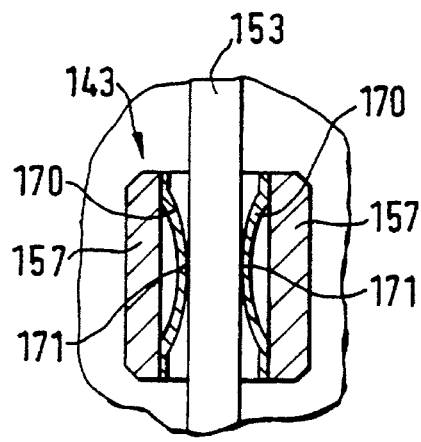
FIG. 6a is a view showing a further variant of the indicating device in a section taken along the line VII—VII in FIG. 6.

FIG. 6a shows a further variant of the indicating device 140. In this indicating device an elastically deformable holding element 170 is clamped between the guiding rail 153 and the recess 158 of the substantially stationary indicating part 143. The holding element 170 applies a force acting on the indicating part 143 transversely to the longitudinal extension of the guiding rail 153. It is possible to provide a holding element 170 only between one side of the guiding rail 153 and the recess 158. Alternatively, it is possible to provide a holding element 170 correspondingly between both facing sides of the guiding rail 153 and the recess 158 as shown in FIG. 6a. The holding element 170 can be formed as flat spring which extends along the longitudinal extension of the guiding rail 153 and has a bend 171 in its central region. The flat spring 170 abuts with is ends against the guiding rail 153 or the indicating part 143 and with its central region 171 against another part or in other words either the indicating part 143 or the guiding rail 153. The bending of the flat spring 170 with the indicating part 143 arranged on the guiding rail 153 is elastically reduced and therefore the flat spring 170 applies a force to the indicating part 143 transversely to the longitudinal extension of the guiding rail 153. Thereby in this embodiment the indicating part 143 is also arranged with a slight press fit on the guiding rail 153, and therefore an unintentional displacement of the indicating part 143 due to vibrations or other influences is prevented. This construction with the holding element 170 can also be utilized for the indicating device 40 in accordance with the first embodiment.

It will be understood that each of the elements described above, or two or more together, may also find a useful application in other types of constructions differing from the types described above.

While the invention has been illustrated and described as embodied in a headlight for a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A headlight for a vehicle, comprising a reflector; a holder adjustably supporting said reflector; an adjusting device which adjusts said reflector relative to said holder; an indicating device for indicating a deviation of a setting of said reflector from a predetermined nominal setting, said indicating device having a movable indicating part which follows an adjusting movement of said reflector and another indicating part which is substantially stationary relative to said holder, said substantially stationary indicating part being movable along a movement direction of said movable indicating part to a base setting and is fixable relative to said holder in a set position; and a guide for guiding said substantially stationary indicating part, said substantially stationary indicating part and said guide being formed so that said indicating part is difficult to displace on said guide, said substantially stationary indicating part being displaceable on said guides under the action of an applied force, and for its displacement and its final position after the displacement, it is not necessary to release and then to apply any clamping means.

2. A headlight as defined in claim 1, wherein said substantially stationary indicating part has a receptacle for a tool for displacing said substantially stationary indicating part.

3. A headlight for a vehicle, comprising a reflector; a holder adjustably supporting said reflector; an adjusting device which adjusts said reflector relative to said holder; and indicating device for indicating a deviation of a setting of said reflector from a predetermined nominal setting, said indicating device having a movable indicating part which follows an adjusting movement of said reflector and another indicating part which is substantially stationary relative to said holder, said substantially stationary indicating part being movable along a movement direction of said movable indicating part to a base setting and is fixable relative to said holder in a set position; and a guide for guiding said substantially stationary indicating part, said substantially stationary indicating part and said guide being formed so that said indicating part is difficult to displace on said guide, said guide being rail-shaped, said substantially stationary indicating part being arranged on said rail-shaped guide and partially surrounding said rail-shaped guide.

4. A headlight as defined in claim 3, wherein said rail-shaped guide for said substantially stationary indicating part has a dove-tail-shaped cross-section.

5. A headlight as defined in claim 3, wherein said substantially rail-shaped guide has an asymmetrical cross-section.

6. A headlight as defined in claim 3, wherein said substantially stationary indicating part is arranged on said rail-shaped guide with a press fit.

7. A headlight as defined in claim 3, wherein said substantially stationary indicating part has a projection engaging said rail-shaped guide and provided with a recess, said recess having a smaller cross-section than a cross-section of said guide in condition when said substantially stationary indicating part is not arranged on said guide, said recess being elastically expansible.

8. A headlight as defined in claim 3, wherein said substantially stationary indicating part has a projection engaging said rail-shaped guide and having a recess, said having a greater cross-section than said recess in condition when said substantially stationary indicating part is not arranged on said guide, said guide having an elastically reducible cross-section.

9. A headlight as defined in claim 3; and further comprising a pretensioned holding element clamped between said substantially stationary indicating part and said guide so as to make said substantially stationary indicating part difficult to displace on said guide.

10. A headlight as defined in claim 3, wherein said holder is formed as a housing accommodating said reflector and said movable indicating part, said housing having a substantially transparent portion through which said movable indicating part is visible from outside of said housing, said substantially stationary indicating part being arranged outside of said housing in the region of said transparent portion.

11. A headlight as defined in claim 3, wherein said transparent portion of said housing is formed by a transparent part which is connected with said housing.

12. A headlight as defined in claim 11, wherein said transparent part is formed as an indicating tube with a tubular part, said movable indicating part being displaceable inside said tubular part.

13. A headlight as defined in claim 11, wherein said guide for said substantially stationary indicating part is arranged on said transparent part.

14. A headlight for a vehicle, comprising a reflector; a holder adjustably supporting said reflector; an adjusting device which adjusts said reflect relative to said holder; an indicating device for indicating a deviation of a setting of said reflector from a predetermined nominal setting, said indicating device having a movable indicating part which follows an adjusting movement of said reflector and another indicating part which is substantially stationary relative to said holder, said substantially stationary indicating part being movable along a movement direction of said movable indicating part to a base setting and is fixable relative to said holder in a set position; and a guide for said substantially stationary indicating part, said substantially stationary indicating part and said guide being formed so that said substantially stationary indicating part is movable to said base setting on said guide by an operator but does not move on said guide under the action of vibrations and other influences occurring during travel of a vehicle said substantially stationary indicating part being displaceable on said guides under the action of an applied force, and for its displacement and its final position after the displacement, it is not necessary to release and then to apply any clamping means.

* * * * *